Oct. 22, 1963    R. B. KERSHNER ETAL    3,107,543
RADAR ANTENNA POSITIONING DEVICE
Filed Feb. 10, 1958    6 Sheets-Sheet 1

INVENTORS
RICHARD B. KERSHNER
THOMAS W. SHEPPARD
BY
ATTORNEYS

INVENTORS
RICHARD B. KERSHNER
THOMAS W. SHEPPARD
BY
ATTORNEYS

INVENTORS
RICHARD B. KERSHNER
THOMAS W. SHEPPARD
BY
ATTORNEYS

INVENTORS
RICHARD B. KERSHNER
THOMAS W. SHEPPARD
BY
ATTORNEYS

Oct. 22, 1963   R. B. KERSHNER ETAL   3,107,543
RADAR ANTENNA POSITIONING DEVICE
Filed Feb. 10, 1958   6 Sheets-Sheet 6

INVENTORS
RICHARD B. KERSHNER
THOMAS W. SHEPPARD
BY
ATTORNEYS

United States Patent Office 3,107,543
Patented Oct. 22, 1963

3,107,543
RADAR ANTENNA POSITIONING DEVICE
Richard B. Kershner and Thomas W. Sheppard, Silver Spring, Md., assignors to the United States of America as represented by the Secretary of the Navy
Filed Feb. 10, 1958, Ser. No. 714,449
10 Claims. (Cl. 74—99)

The present invention relates to electro-hydraulic servomechanisms. More specifically, it relates to a mechanism particularly suited as a positioning device for a radar dish antenna.

In selecting a particular type of servomechanism for use as a radar antenna positioning device, the most important criteria have proven to be the linearity of the response of the device, and the speed with which such response is obtained. Linearity is obviously of importance if accurate target bearings are to be provided. In ground based search and tracking radars, the speed of servo response is ordinarily not required to be great since bearing angles to distant targets change only slowly.

It has therefore been common practice to employ electrical servos as dish positioning devices since such devices provide linear response with heretofore adequate speed. However, radars requiring dish antennas have recently been adapted to use as guided missile homing systems. In such applications the speed of response of an electrical servo is extremely inadequate since, as a missile and target close range at supersonic speed, the bearing angles change rapidly.

Electrical servos have therefore been abandoned in favor of electro-hydraulic servos. The latter types, due to the lower inertia of the actuator, possess a much higher response speed than electrical types. In previous hydraulically actuated servos, however, it has been necessary to compromise in the matter of the linearity of the response, since the natural motion of the hydraulic actuator is reciprocating while the motion of the dish is necessarily rotary. Attempts have previously been made to convert the linear actuator motion into rotary or pivotal motion with minimum error by mounting the actuator cylinder for oscillating motion and linking the piston to the radar dish through a bell crank. It is necessary in such an arrangement that the piston connecting rod be relatively long and the crank arm short to achieve reasonable linearity of operation. While the departure of such a mechanism from linearity is tolerable, it nevertheless has several disadvantages, among which are that the pressure fluid must be supplied to the cylinder through a flexible coupling and that the necessarily long connecting rod increases the bulk of the device.

It is therefore an object of the present invention to provide a radar antenna positioning servo characterized by rapid, linear response.

Another object of the present invention is to provide an electro-hydraulic servomechanism for positioning a radar dish antenna in which a reciprocating motion is converted linearly into rotary motion.

A further object of the present invention is to provide an electro-hydraulic servomechanism having simplified means for admitting pressure fluid to the hydraulic actuator.

Other objects and many of the attendant advantages of this invention will be readily appreciated as the same becomes better understood by the reference to the following detailed description when considered in connection with the accompanying drawings, wherein:

FIG. 7 is a sectional view taken along the line 7—7 of FIG. 6;

FIG. 8 is a sectional view taken along the line 8—8 of FIG. 5; and

Figure 1:
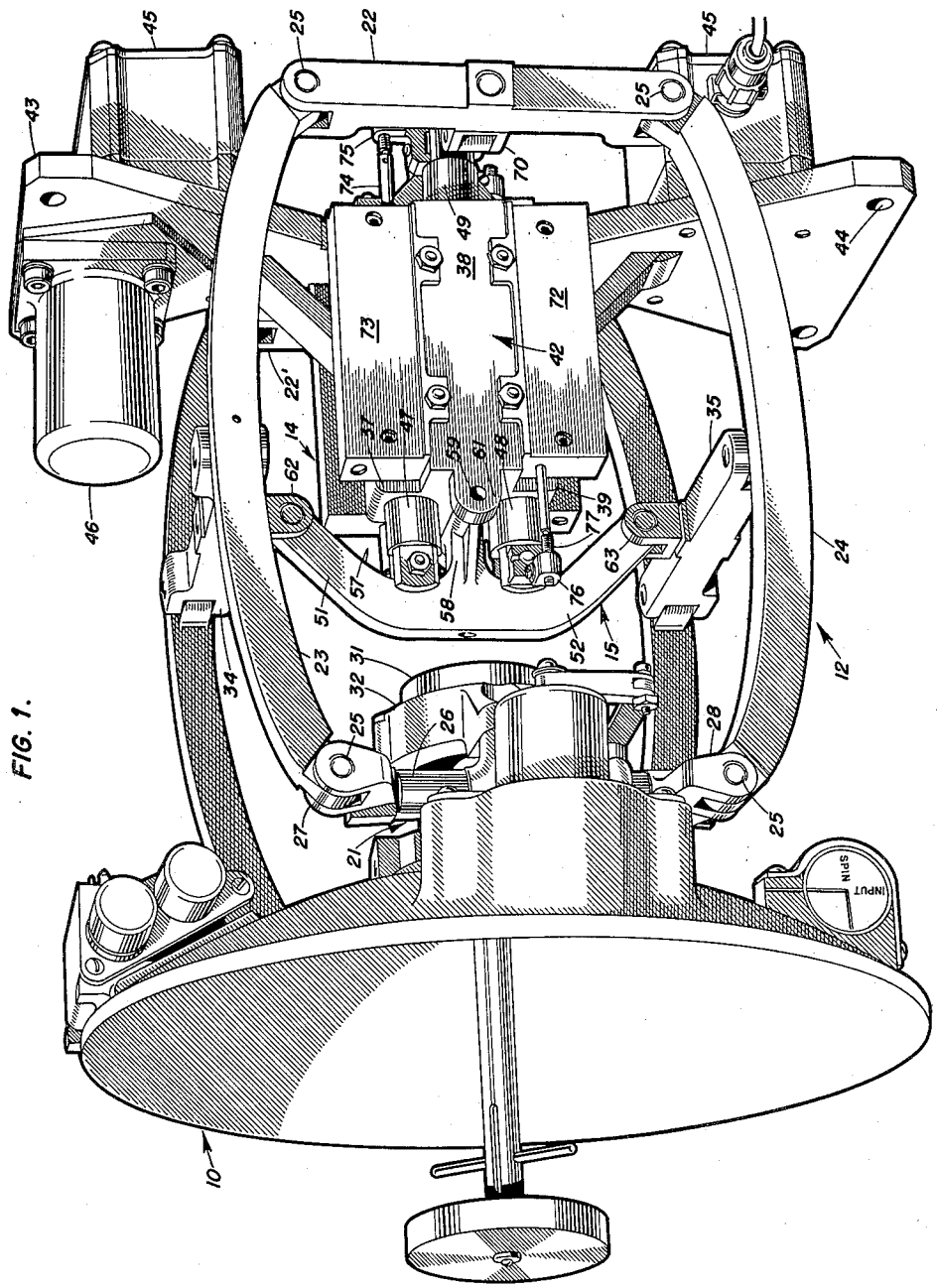
FIGS. 1 and 2 are perspective views of the present invention.
Figure 2:
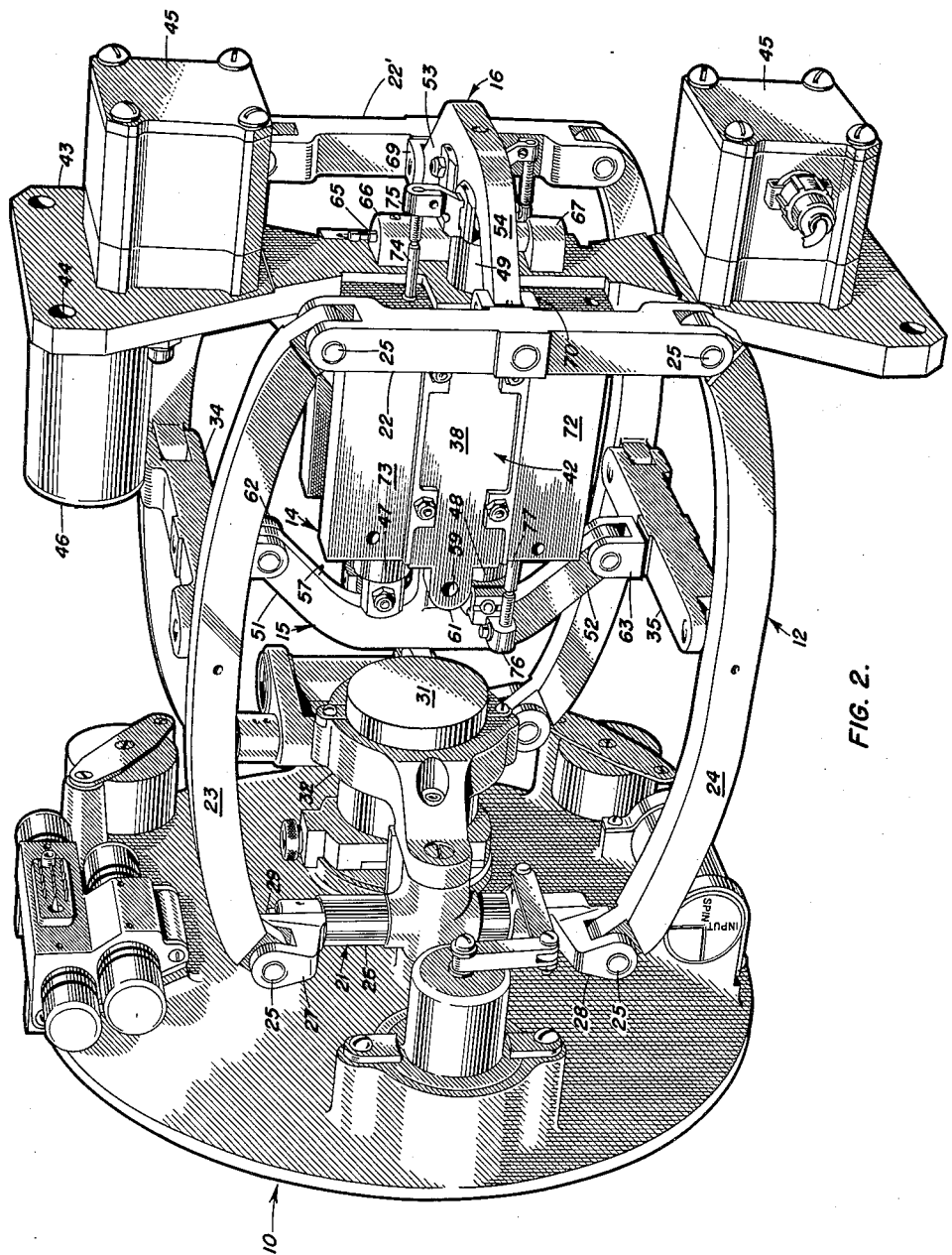

Referring to the drawings, and particularly FIGS. 1, 2, 3 and 5 thereof, a radar dish antenna shown generally at 10 is supported for pivotal movement in both the azimuth and elevation planes by a linkage gimbal 12. The gimbal comprises generally four four-link mechanisms each arranged to form one face of a parallelpiped. The hydraulic actuator 14 comprises generally four single acting hydraulic pistons clustered within the linkage gimbal 12. Reciprocating piston motion is linearly converted into rotary motion by cams 15 and 16 having surfaces described by an involute of a circle. The gimbal 12 linearly transmits cam rotation to the dish 10.

Figure 5:
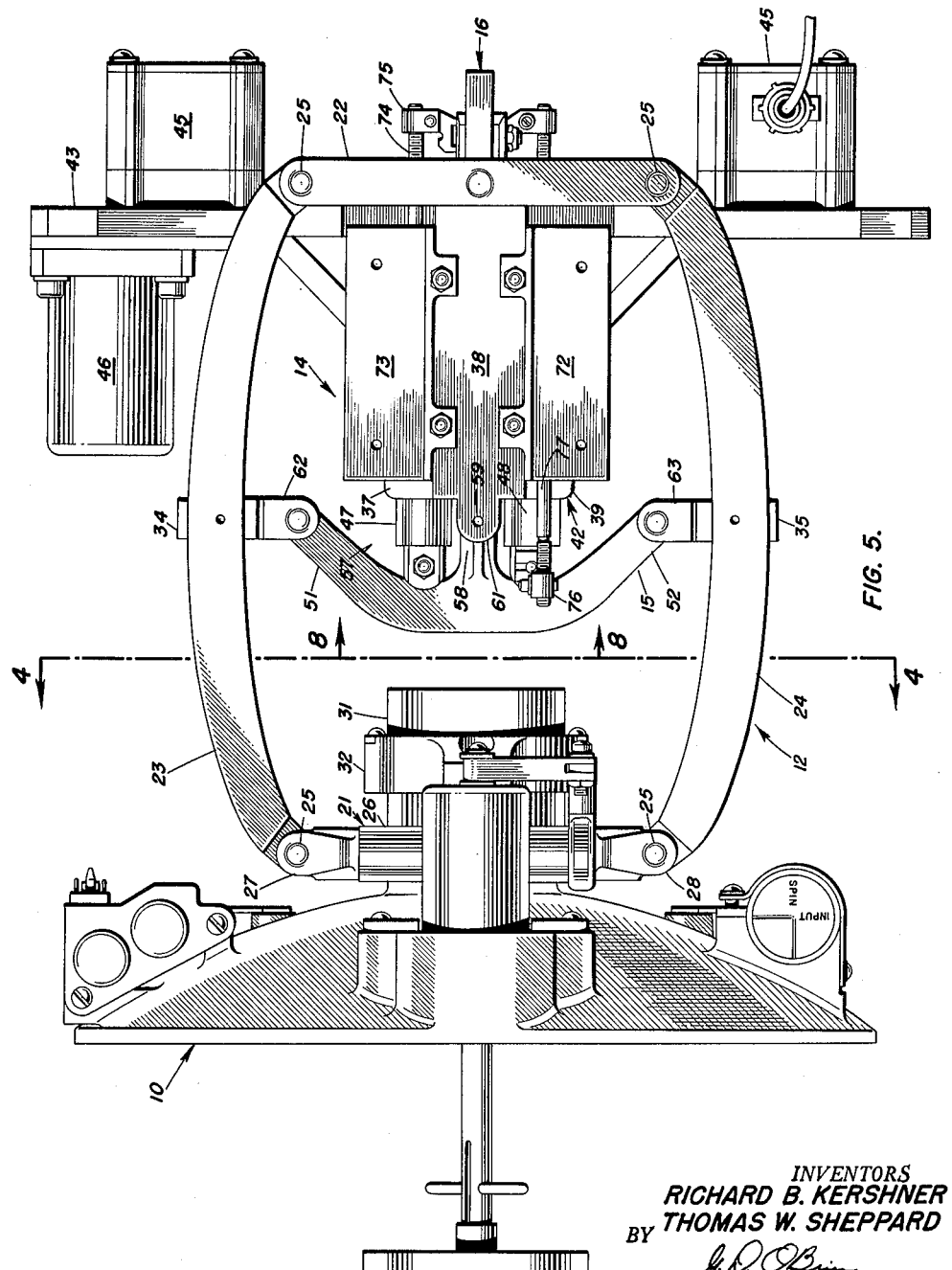
FIG. 5 is a side elevation of the invention.

Considering the linkage gimbal 12 in detail now, and referring particularly to FIG. 5, each of the two four-link mechanisms forming the vertical sides of the parallelepiped 12 includes equal length front and rear vertical links 21 and 22, and equal length top and bottom horizontal 23 and 24. The links 21, 22, 23 and 24 are secured at their ends by suitable pin joints 25 thereby creating a deformable parallelogram. It will be understood however that because of the necessity of providing clearances, links 23 and 24 are arcuate rather than straight, and in fact, the links may assume any suitable form so long as the corner joints thereof lie at the corners of a parallelogram.

Figure 4:
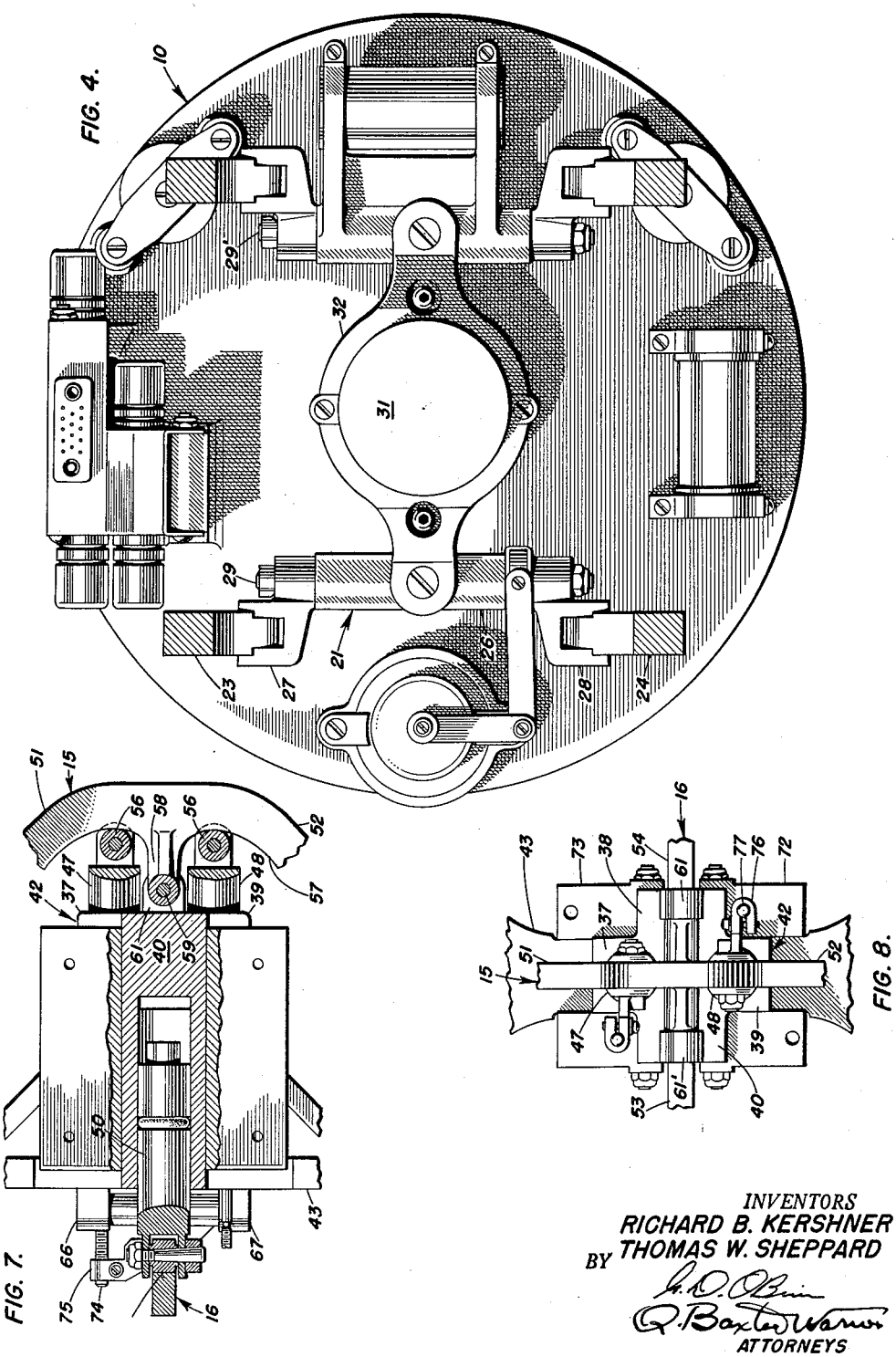
FIG. 4 is a sectional view taken along the line 4—4 of FIG. 5.

As best seen in FIG. 4, front link 21 includes a center portion 26 offset from the plane containing links 23 and 24 by L-brackets 27 and 28 pivotally secured to portion 26 by a through bolt 29. The dish 10, including an antenna nutating motor 31, is rigidly secured to portion 26 of link 21 by a clamp assembly 32.

Figure 3:
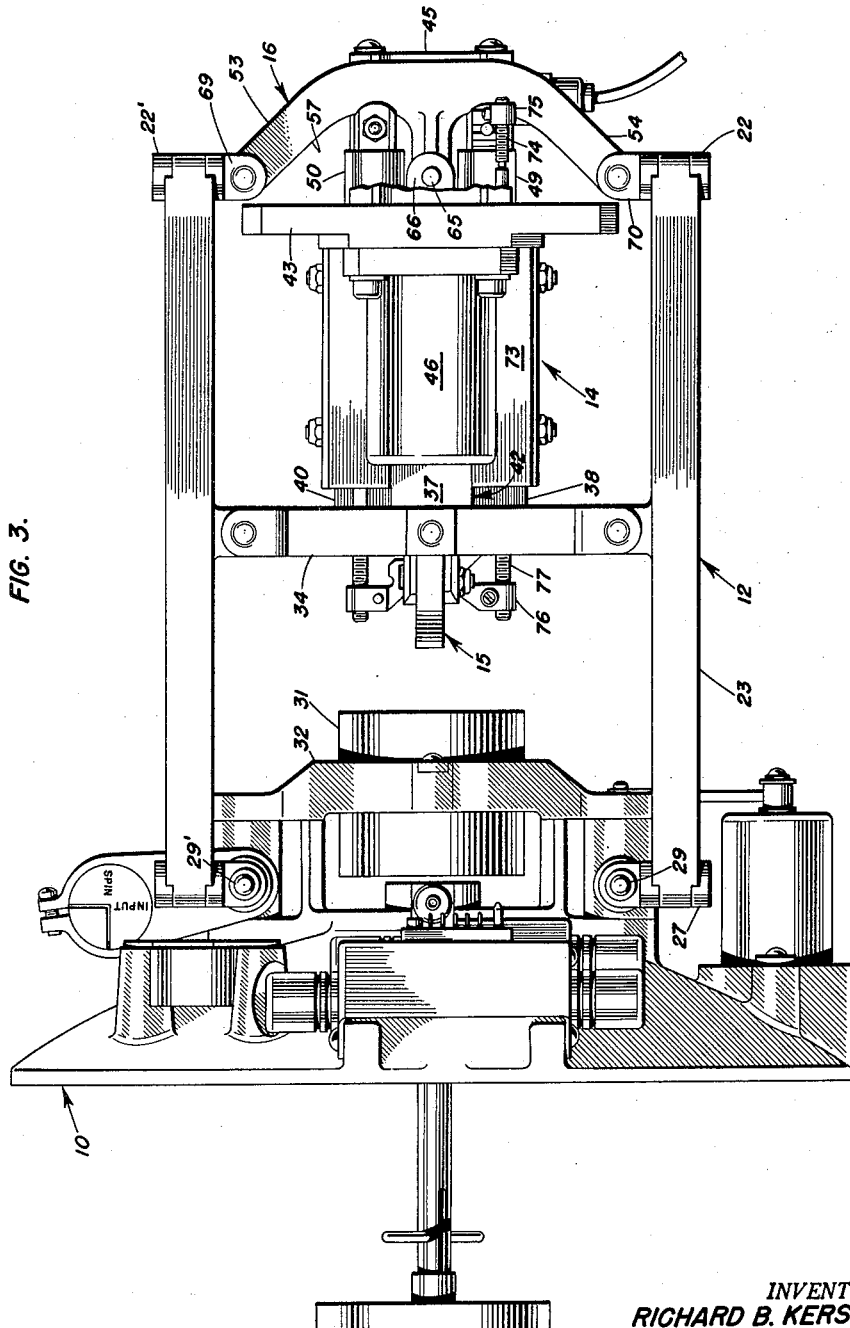
FIG. 3 is a plan view of the present invention.
Figure 6:
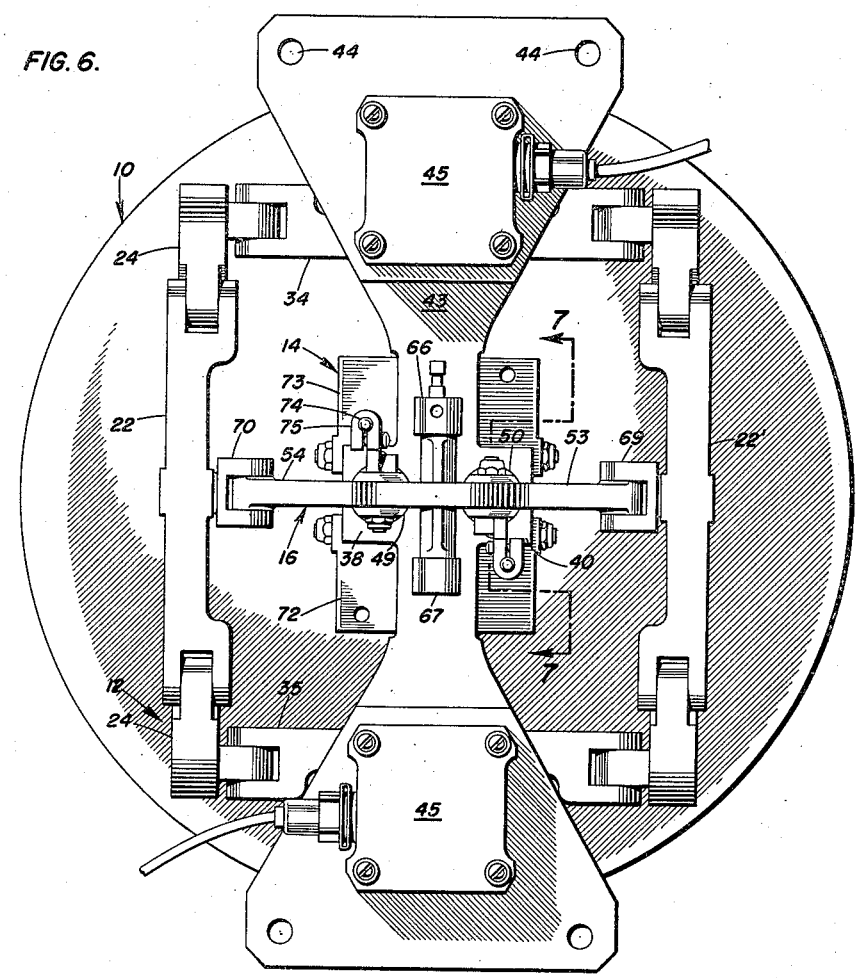
FIG. 6 is a rear view of the invention with certain of the background details omitted for purposes of clarity.

Referring particularly to FIGS. 3 and 6, the top and bottom faces of the linkage gimbal parallelepiped are formed by joining the vertical sides just described by pin jointed top and bottom transverse links 34 and 35. Transverse links 34 and 35 have a length between pin centers equal to the distance separating the center lines of through bolts 29 and 29' thereby creating top and bottom deformable parallelograms. It will be understood that the rigid radar dish 10 virtually constitutes both the front top link and the bottom link of the four link mechanisms which are the top and bottom faces of the parallelepiped linkage gimbal 12.

The hydraulic actuator 14 comprises a cluster of four cylinders 37, 38, 39 and 40 cast in a symmetrical cruciform block 42 (FIG. 8) with the axes of opposite cylinders 38 and 40 lying in the azimuth plane and the axes of opposite cylinders 37 and 39 lying in the elevation plane. The cylinders are fixed to a manifold plate 43 (FIG. 6) which is provided with mounting holes 44 for securing the plate and cylinders to the missile airframe. The manifold 43 is a laminate of an interior core of slotted plates and external cover plates thereby providing the channels necessary for the admission and venting of pressure fluid in the various cylinders. Transfer valves 45 and a pressure fluid filter 46 (FIG. 5) are likewise mounted directly on manifold plate 43 thus eliminating tortuous tubing connections to the cylinders.

Again referring to FIGS. 3 and 5, single acting pistons 47 and 48 work forwardly within the cylinders 37 and 39, respectively, against opposite arms 51 and 52 of cam 15. In a like arrangement, pistons 49 and 50 work rearwardly within cylinders 38 and 40 against arms 53 and 54 of cam 16. Referring particularly to FIG. 7, the pistons 47, 48, 49 and 50 are each provided with cam follower rollers 56 bearing on the shaped surfaces 57 of cam arms 51, 52, 53 and 54. The surfaces 57 are each involutes having particularly desirable properties as will be discussed in greater detail hereinafter.

Cam 15 is generally arcuate and includes a perpendicular center leg 58. Cam 15 is jointed for pivotal movement in the elevation plane by a pin 59 passed through eyestuds 61 and 61′ cast at the forward center of the cylinder block 42. The cam legs 51 and 52 are rearwardly curved and pinned at their outer ends to clevises 62 and 63 pivotally mounted at the center of transverse links 34 and 35. The centers of the eyes of clevises 62 and 63 are aligned with the center of pin 59 and the distance between the clevis eye centers is equal to the distance between the centers of the pin joints 25 of front link 21 and rear link 22. Cam 15 provides vertical support to the linkage parallelepiped 12 and dish 10. Cam 16 is identical to cam 15 and is mounted for pivotal movement in the azimuth plane by a pin 65 passed through eye studs 66 and 67 fixed to the rear face of manifold plate 43. The outer ends of arms 53 and 54 are pinned to clevises 69 and 70 pivotally mounted at the centers of rear link 22 and its opposite member 22′. Cam 16 provides lateral support to the linkage gimbal 12 and dish 10.

Feedback potentiometers 72 and 73 provides the necessary electrical feedback signal for controlling the position of the actuator pistons 47, 48, 49 and 50. The slider 74 of potentiometer 73 is secured to the piston 49 by clamp 75. A similar clamp 76 secures the slider 77 of potentiometer 72 to piston 48.

Control of the actuator 14 is achieved in a conventional manner. Separate servo amplifiers (not shown) receive the electrical input signals, representing the required rotation of the radar dish 10 in either the azimuth or elevation planes, and the feedback signals from potentiometers 72 and 73. The difference between the input and feedback signals, highly amplified, drives the torque motors within the transfer valves 45 thus controlling the flow of fluid to the various cylinders.

Figure 9:
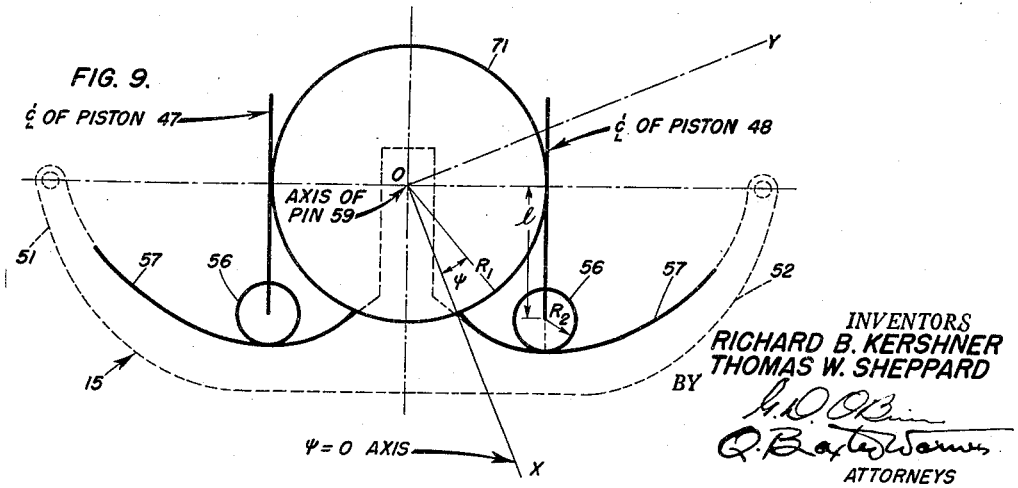
FIG. 9 is a diagram illustrating the geometry of the cams employed in the present invention.

The cam surfaces 57 are generated as involutes of circles. An involute of a circle is commonly defined as the curve described by the end of a string which is kept taut while being unwound from a circle. In FIG. 9, the geometry of the cams is illustrated. The dotted portions of the cam outline those portions not critical to its operation. The generating circle 71 has its center at the center of pin 59 and is tangent to the center lines of opposite pistons 47 and 48. The radius of circle 71 is $R_1$ and the radius of roller 56 is $R_2$. The length of the pistons from the point of tangency to circle 71 to the center of roller 56 is $l$.

By reason of the properties of an involute, the following equation expresses the relationship between piston positions and cam rotation $\psi$.

$$l + R_2 = R_1 \psi \tag{1}$$

The equation of the involute may be expressed in many forms. For convenience, however, the X and Y axes have been relocated as shown. The coordinates of the surface 57 then become $$X = R_1 \cos \psi + R_1 \psi \sin \psi \tag{2}$$

$$Y = R_1 \sin \psi - R_1 \psi \cos \psi \tag{3}$$

Equation 1 is linear and therefore changes in $\psi$ occasioned by movement of the pistons will be linearly transformed into rotary motion of the cam.

Rotation of cams 15 and 16 results in identical dish rotation by virtue of the fact that the gimbal mechanism 12 maintains links 21 and 22 parallel to cam 15 and links 34 and 35 parallel to cam 16.

It will now be understood that the previously stated objects of the invention are attained in the device described. Moreover, it is evident that the gimbal and actuator assembly is not strictly confined to radar applications but could find utility whenever limited rotary motion is required.

Obviously many modifications and variations of the present invention are possible in the light of the above teachings. It is, therefore, to be understood that within the scope of the appended claims the invention may be practiced otherwise than as specifically described.

What is claimed is:

1. A device for supplying motion to a radar antenna, comprising a linkage means arranged in the outline of a deformable parallelepiped having an axis of symmetry, radar antenna means, means mounting said radar antenna means on one end of said parallelepiped linkage means so that the central portion of said antenna means is located on the axis of symmetry of said parallelepiped linkage means, means for imparting reciprocal motion to one pair of opposite sides of said parallelepiped linkage means connected to said antenna mounted end, means for reciprocating the remaining pair of opposite sides of said parallelepiped linkage means connected to said antenna mounted end, actuator link means connected to opposite sides of said parallelepiped linkage means, and support means connected to said actuator link means on said axis of symmetry.

2. A device as recited in claim 1 wherein said first and second mentioned motion imparting means each includes a linearly acting actuating means bearing on said actuator link means for imparting motion thereto.

3. A radar antenna positioning device comprising, two closed four-element mechanisms forming parallelogram linkages of equal size and positioned in parallel planes, a plurality of links pivotally connecting said linkages to form a parallelepiped having an axis of symmetry parallel to said planes, radar antenna means, means mounting said radar antenna means on one end of said parallelepiped transverse to said planes, means for moving said four-element mechanisms parallel to said axis of symmetry, means for moving the sides of said parallelepiped adjacent said antenna mounted end and said four-element mechanisms parallel to said axis of symmetry, actuator link means connected to opposite sides of said parallelepiped, and support means connected to said actuator link means on said axis of symmetry.

4. A radar antenna positioning device comprising, a plurality of interconnected four-link mechanisms arranged generally in the form of a parallelepiped having an axis of symmetry, the sides of which are defined by said links, wherein opposite links of each of said mechanisms are arranged to act along parallel lines and adjacent sides of said parallelepiped each have a link in common, radar antenna means, means on one end of said parallelepiped for supporting the antenna so that the central portion of said antenna is located on said axis of symmetry of said parallelepiped, a support, a first cam member jointed to one pair of opposite sides of said paralellepiped adjacent said antenna mounted end and pivotally attached to said support at a point located on said axis of symmetry, a second cam member jointed to the remaining pair of opposite sides of said parallelepiped adjacent said antenna mounted end and pivotally attached to said support at a point located on said axis of symmetry, and reciprocating means bearing on each of said cam members to cause pivotal motion of said antenna means.

5. A device as claimed in claim 4 wherein the surface of each of said cam members upon which said reciprocating means bears is shaped in accordance with an involute of a circle.

6. A radar antenna device comprising, a plurality of interconnected four-link mechanisms arranged generally in the form of a parallelepiped having an axis of symmetry, the sides of which are defined by the links of said mechanisms, wherein opposite links of said mechanisms are arranged to act along parallel lines and adjacent faces of said parallelepiped each have a link in common, radar antenna means, means on one end of said parallelepiped for supporting said antenna so that the antenna is located on said axis of symmetry of said paralellepiped, a support, a first cam pivotally attached to said support at a point lying on said axis of symmetry, said first cam extending parallel to two of the sides adjacent said antenna mounted end and being jointed to the remaining sides of said parallelepiped adjacent said antenna mounted end, a second cam pivotally attached to said support at a point located on said axis of symmetry, said second cam extending in a direction transverse to said first cam and being jointed to said remaining sides of said paralellepiped, and hydraulic means for rotating said cams to alter the position of said antenna.

7. A device as claimed in claim 6 wherein said cams include surfaces described by involutes of a circle.

8. A device as claimed in claim 6 wherein said hydraulic means includes piston members arranged to bear on said cam members to impart rotation thereto.

9. A radar antenna positioning device, comprising a plurality of interconnected four-link mechanisms arranged generally in the form of a paralellepiped having an axis of symmetry, the sides of said paralellepiped being defined by the links of said mechanisms with adjacent sides of said paralellepiped each having a link in common and wherein each of said mechanisms has its opposite links arranged to act along parallel lines, radar antenna means, means on one end of said parallelepiped transverse to said axis of symmetry for supporting said antenna, a support, a first elongate cam member pivotally attached to said support at a point on said axis of symmetry, said first cam member extending parallel to two of the links of said one end and having its ends jointed to the opposite sides of said paralellepiped adjacent said two links, a second elongate cam member pivotally attached to said support at a point on said axis of symmetry, said second cam member extending in a direction transverse to said first cam member and parallel to the other two links of said one end, the end of said second cam being jointed to the opposite sides of said paralellepiped containing said two links of said one end, a first pair of single acting pistons disposed on opposite sides of said axis of symmetry and bearing on said first cam member to impart rotation thereto, and a second pair of said single acting pistons also disposed on opposite sides of said axis of symmetry and bearing on said second cam member to impart rotation thereto.

10. A device as claimed in claim 9 wherein the cam surfaces upon which said pistons bear are shaped to conform to an involute of a circle.

References Cited in the file of this patent
UNITED STATES PATENTS

| | | |
|---|---|---|
| 2,685,352 | Hukari | Aug. 3, 1954 |
| 2,678,394 | Curtis | May 11, 1954 |
| 2,706,781 | Goss | Apr. 19, 1955 |
| 2,835,892 | Szekely | May 10, 1958 |
| 2,850,904 | Wilson et al. | Sept. 9, 1958 |
| 2,856,603 | Burns et al. | Oct. 14, 1958 |
| 2,893,002 | Ross | June 30, 1959 |